No. 674,178. Patented May 14, 1901.
W. L. POST.
WAGON BRAKE.
(Application filed Mar. 19, 1901.)
(No Model.)
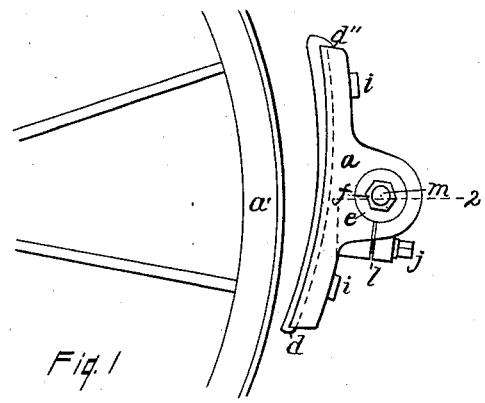
Fig. I
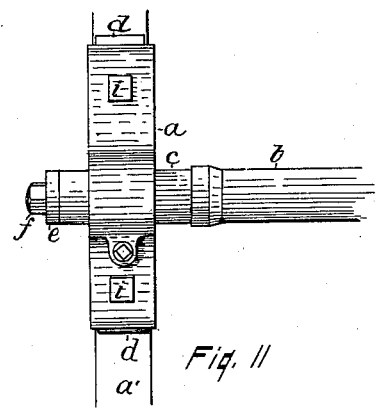
Fig. II
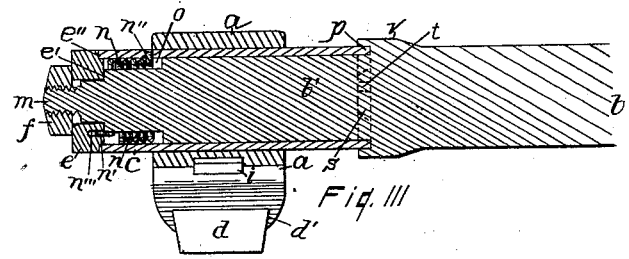
Fig. III
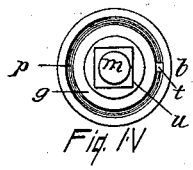
Fig. IV
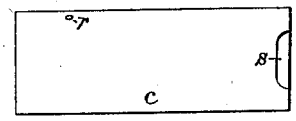
Fig. V
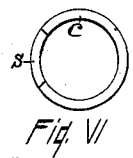
Fig. VI
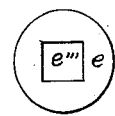
Fig. VII
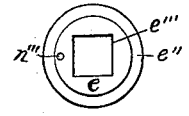
Fig. VIII
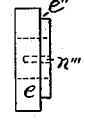
Fig. IX
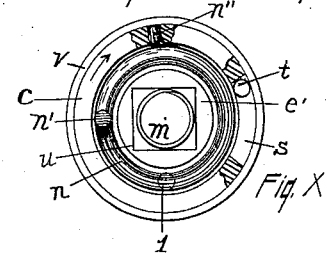
Fig. X
Witnesses
Inventor
William Ladue Post
By Attorney
THE NORRIS PETERS CO., PHOTO-LITHO., WASHINGTON, D. C.

UNITED STATES PATENT OFFICE.

WILLIAM LADUE POST, OF COLDSPRING, NEW YORK.

WAGON-BRAKE.

SPECIFICATION forming part of Letters Patent No. 674,178, dated May 14, 1901.

Application filed March 19, 1901. Serial No. 51,951. (No model.)

*To all whom it may concern:*

Be it known that I, WILLIAM LADUE POST, a citizen of the United States, and a resident of Coldspring, in the county of Putnam and State of New York, have invented certain new and useful Improvements in Wagon-Brakes, of which the following is a specification.

My invention relates to brakes for vehicles, and has for its objects means for making the brake somewhat automatic in its adjustments, simplifying the application of the brake to a vehicle, preventing rattling of the several parts, and rendering the internal devices dust-proof. These objects are attained by the means set forth in this specification and the accompanying drawings.

Attention will first be directed to the drawings, in which like letters refer to similar parts throughout the several views.

Figure I represents my brake in its normal relation to a vehicle-wheel. Fig. II is a right-hand elevation of the brake as shown in Fig. I. Fig. III is a cross-section of the brake through the angular broken line 2, Fig. I, showing the actual size of a brake for a light vehicle. Fig. IV is a left-hand end view of the shank $b\ b'$. Fig. V is a side view of the sleeve $c$, and Fig. VI is a right-hand end view of the sleeve $c$. Figs. VII, VIII, and IX are respectively the front, reverse, and edge views of the collar $e$. Fig. X is an end partly-sectional view showing the action of the spring $n$ on the sleeve $c$.

Figs. II and III show this brake to comprise a shank $b$, upon which is a sleeve $c$, held in place by a collar $e$ and nut $f$, and the brake-shoe $a$, clamped to the sleeve $c$. The shoe $a$ may be of cast metal and is bored to fairly fit the sleeve $c$. A bearing for a clamping-screw $j$ is provided, which is slotted through to the hole through the shoe, forming a well-known clamping means. The shoe is held in position on the sleeve by means of this clamp, and it will be observed in Fig. II that the shoe has considerable range for lateral adjustment on the sleeve either right or left, and this constitutes one feature of my invention. A brake-piece $d$ is inserted in the face of the shoe $a$ by means of a dovetail, as shown at $d\ d'$, Fig. III, an extension $d''$ at the top of the piece forming a head to retain the piece in place vertically. This piece is shown as slightly thickened at the top to compensate for the extra wear at that point. In addition to this head and the dovetail the plate is secured by bolts $i\ i$.

The shoe $a$ may of course be fashioned to suit or adapt it to the vehicle on which it is to be used and may be applied to any form of wheel-tire.

Fig. III shows the shank $b$ to consist of two parts, the right-hand end for welding to the brake-lever mechanism and the part $b'$ to receive the sleeve $c$ and devices appertaining to it. The enlarged part $v$ of the shank contains a groove $p$, Figs. III and IV, adapted to receive one end of the sleeve $c$, and there is a pin $t$ in the groove that falls within a recess or notch $s$, Fig. V, at the end of the sleeve. The part $b'$ fills the sleeve $c$ to nearly its end, where the part is reduced in size, forming an annular chamber $o$ within the sleeve. At the end of the chamber $o$ the part $b'$ is squared, as at $u$, Fig. IV, and the part terminates in a screw $m$. A collar $e$ (shown in detail in Figs. VII, VIII, and IX) has a square hole $e'''$ through it and fits upon the square $u$, and the nut $f$ holds the collar solidly against the shoulder $e'$. A recess $e''$ on the inner edge of the collar $e$ allows that end of the collar to project within the sleeve, giving support to the sleeve at the outer extremity of the chamber $o$ and forming a double bearing-surface for the end of the sleeve. As thus put together the sleeve is so fitted that it will turn freely within its confinement and within the limits of the slot $s$, within which the stop $t$ projects. It will be observed that the joints thus formed at each end of the sleeve are such as to prevent the passage of dust to the interior of the sleeve.

The chamber $o$ is to receive a spiral spring $n$, one end $n''$ of which is inserted in a hole $r$, Fig. V, in the sleeve, and the other end $n'$ hooks in a hole $n'''$ in the collar $e$, Figs. III and VIII.

Fig. X is an enlarged end view of several of the parts described and shows the action of the spring $n$ upon the sleeve $c$, the sleeve being shown as cut away to reveal the notch $s$ and stop $t$, as also the $n''$ end of the spring. If, as the several parts stand, the end $n'$ of the spring be normally at the position shown and the collar $e$, with the end $n'$ of the spring in the hole $n'''$ in the collar, be placed in position on the square $u$, so that the end of the spring will be held at the point $n'$, where it is shown, the tension put upon the spring will turn the sleeve to the right until it is stopped by the pin $t$, as shown. Such would be the relation of the parts when mounted to position on the brake-rods, when it would remain only to slip the brake-shoe $a$ to its place on the sleeve and secure it at a suitable angle with the wheel, as in Fig. I. The length of the sleeve will admit of an easy lateral adjustment, as shown in Fig. II, as it will be immaterial which part of the sleeve is occupied by the shoe, so that the adjustment to parallelism with the wheel-tire will not be a matter for close measurement for the welding of the shank $b$ to the brake-lever mechanism.

If the brake is held in relation to the wheel, as shown in Fig. I, when the shoe is thrown against the wheel the plate $d$ would, of course, be parallel with the face of the tire, and the pin $t$, Fig. X, within the notch $s$, would be about midway of the notch, so that the shoe would be free to adapt itself to any variations of the tire, but as soon as the brake was released from the wheel the spring would throw back the moving parts to a firm and unshakable position.

In the application of my invention I do not wish to be limited to the precise forms of the several parts herein shown, so long as I adhere to the principles of my invention.

Having described my invention, what I claim, and desire to secure by Letters Patent, is—

1. In a vehicle-brake the combination of a shank having a grooved shoulder and a stop therein, a sleeve on said shank extending into said groove and notched over said stop, the shank reduced at the end to form a chamber within the sleeve for a spring, a square shoulder on the shank for holding a collar as a retainer of the sleeve and holder of one end of a spring, a nut on the end of the shank to hold the several parts together, a spring within the said chamber and hooked into the sleeve and collar, and a brake-shoe adjustably clamped to said sleeve, substantially as herein set forth.

2. In a vehicle-brake substantially as described, a sleeve on which the brake-shoe may be laterally adjusted, and having a bearing in a grooved shoulder of the shank at one end, and an end and internally-projecting bearing at the opposite end, substantially as and for the purpose set forth.

3. In a vehicle-brake of the character described, the combination of a dust-proof sleeve acted upon by an internal spring, and a brake-shoe provided with means for adjustably clamping it on the sleeve, substantially as set forth.

4. In a vehicle-brake the combination of a dust-proof sleeve acted upon by an internal spring substantially as described, and a brake-shoe provided with a split bearing and clamping spring for lateral adjustment on the sleeve.

Signed at Coldspring, in the county of Putnam and State of New York, this 7th day of March, A. D. 1901.

WILLIAM LADUE POST.

Witnesses:
SELA L. POST,
CHARLES E. DALZELL.